United States Patent Office 3,592,923
Patented July 13, 1971

3,592,923
PHLOROGLUCINOL ETHERS
Madeleine Vaille, born Penciolelli, Brunoy, France, assignor to Societe Anonyme dite: Orsymonde, Paris, France
No Drawing. Filed Sept. 15, 1969, Ser. No. 858,114
Claims priority, application Great Britain, Sept. 17, 1968, 44,189/68
Int. Cl. A61k 27/00
U.S. Cl. 424—340                                   8 Claims

ABSTRACT OF THE DISCLOSURE

A pharmaceutical composition having antispasmodic and hypercholeretic properties, comprising an inert carrier and an effective quantity of at least one phloroglucinol ether of the general formula

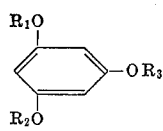

in which $R_1$, $R_2$ and $R_3$ are the same or different and each represents a hydrogen atom or an alkyl group having up to 3 carbon atoms, with the proviso that at least one of $R_1$, $R_2$ and $R_3$ is an alkyl group and that, when each of $R_1$, $R_2$ and $R_3$ is an alkyl group, they are the same and each has 2 or 3 carbon atoms.

---

The present invention relates to the use, as medicaments, of phloroglucinol ethers of the following general formula:

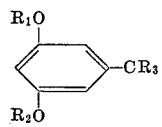

in which $R_1$, $R_2$ and $R_3$ each represents a hydrogen atom or a lower alkyl group having one to three carbon atoms, at least one of the radicals $R_1$, $R_2$ and $R_3$ being an alkyl group and, when the groups $R_1$, $R_2$ and $R_3$ are all alkyl radicals, they are the same and each has two or three carbon atoms.

These compounds have useful therapeutic properties, because they have a renal and gastro-intestinal antispasmodic activity and they also have a hypercholeretic action.

The invention therefore also relates to pharmaceutical compositions containing, as the active ingredient, at least one of the phloroglucinol ethers of the above formula.

The compounds of the invention in which $R_1$ and/or $R_2$ of the general formula are lower alkyl radicals are prepared by reacting phloroglucinol with an alcohol, $R_1OH$, in the presence of gaseous hydrogen chloride. The monoether and diether of phloroglucinol form at the same time.

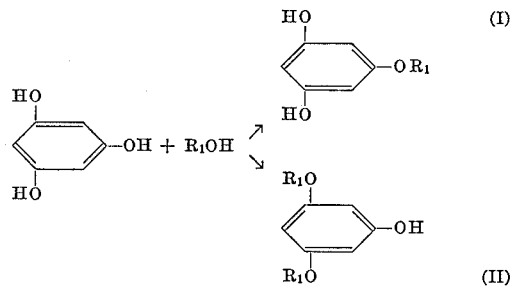

The monoether (I) is extracted with water and the diether (II) with benzene.

The compounds of the invention in which $R_1=R_2=R_3$, all three being the same lower alkyl radicals, can be prepared by reacting anhydrous phloroglucinol in a solvent and in suitable proportions with an alkyl sulphate which transfers its alkyl group to the positions $R_1$, $R_2$ and $R_3$ in the presence of di-potassium carbonate under boiling.

The examples below illustrate the preparation of phloroglucinol ethers according to the present invention.

EXAMPLE 1

3,5-dihydroxy-anisole

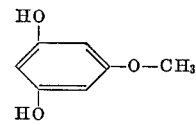

400 g. of anhydrous phloroglucinol and 2.4 l. of methanol were introduced into a 4-litre flask provided with an agitation system, a gas inlet tube, a reflux condenser and an outlet bubble counter.

The reaction mixture was agitated and, after dissolution of the phloroglucinol, dry gaseous hydrogen chloride was introduced via the inlet tube, the input being regulated so that the spontaneous elevation of the temperature rapidly produced smooth boiling of the solvent.

This boiling was maintained for three hours, by using the hydrogen chloride input during the first and third hours and by heating the flask on a water-bath when not introducing the acid gas.

The mixture was allowed to cool and the flask was placed in the refrigerator overnight.

The hydrochloric methanol was eliminated by heating on a water-bath under reduced pressure. The residue was taken up in three 400 ml. quantities of water and then in two 500 ml. quantities of benzene.

After agitation for about 5 minutes and decantation of the two solvents, the aqueous phase was withdrawn and extracted once more with 500 ml. of benzene.

The combined benzene solutions contained various products, in particular, the dimethyl ether of phloroglucinol, which can be subsequently isolated.

The major part of the 3,5-dihydroxy-anisole is found in the aqueous phase. This solution was evaporated by heating on a water-bath under partial vacuum. The dry residue was taken up in two 500 ml. quantities of ethyl ether. After filtration, the ethereal solution was washed twice with 100 ml. portions of cold water, dried over anhydrous sodium sulphate, filtered and then evaporated in vacuo.

The crude 3,5-dihydroxy-anisole so prepared was purified by fractional distillation at a temperature below 206° C. and a pressure of 16 mm. Hg and was then further purified by recrystallization from benzene.

The product obtained, in a final yield of 8%, has the appearance of a slightly amber crystalline powder, the instantaneous melting point of which is 76° C. It is soluble in water, acetone, ethanol and ethyl ether and slightly soluble in benzene and chloroform.

EXAMPLE 2

3,5-dimethoxy-phenol

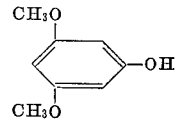

400 g. of anhydrous phloroglucinol and 2.4 l. of methanol were introduced into a 4-litre flask provided with an agitation system, a gas inlet tube, a reflux condenser and an outlet bubble counter.

The mixture was agitated and, after dissolution of the phloroglucinol, dry gaseous hydrogen chloride was introduced via the inlet tube, the rate being regulated so that the spontaneous elevation of the temperature rapidly produced smooth boiling of the solvent.

This boiling was maintained for three hours, by utilizing the input of the hydrogen chloride for the first and third hours and by heating on a water-bath when not introducing the acid.

The mixture was allowed to cool and the flask was placed in a refrigerator over-night. The hydrochloric methanol was eliminated by heating on a water-bath at reduced pressure. The residue was taken up in three 400 ml. quantities of water and then in two 500 ml. quantities of benzene.

After agitation for about 5 minutes and decantation of the two solvents, the aqueous phase was withdrawn and again extracted with 500 ml. of benzene. The benzene solutions were then combined.

The aqueous solution contained various products and, in particular, mono-ethyl phloroglucinol ether, which could be subsequently isolated.

The major part of the 3,5-dimethoxy-phenol was in the benzene phase. This solution was washed twice with 500 ml. of water, dried over anhydrous sodium sulphate, filtered and then evaporated by heating on a water-bath under reduced pressure.

The residue has the appearance of a lightly orange-colored viscous oil. The crude 3,5-dimethoxy-phenol so prepared was purified by fractional distillation at a temperature of 122°–134° C. and a pressure of 1.1 mm. Hg.

The product obtained, in a final yield of 53%, is a well crystallized white product having a melting point (tube) of 34° C. It is soluble in benzene, chloroform, ethanol, acetone and ethyl ether and slightly soluble in water.

EXAMPLE 3

3,5-dihydroxy-phenetole

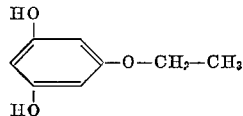

189 g. of anhydrous phloroglucinol and 1 l. of absolute ethanol were introduced into a 2-litre flask provided with an agitation system, a gas inlet tube, a reflux condenser and an outlet bubble counter.

The mixture was agitated and, after dissolution of the phloroglucinol, dry gaseous hydrogen chloride was introduced via the inlet tube, the input being regulated so that the spontaneous elevation of the temperature rapidly produced smooth boiling of the solvent.

This boiling was maintained for three hours by utilizing the hydrogen chloride input during the first and third hours and by heating on a water-bath when not introducing the acid. The contents were allowed to cool and the flask was placed in a refrigerator over-night. The hydrochloric ethanol was then eliminated by heating on a water-bath under reduced pressure. The residue was taken up in two 500 ml. quantities of water and then two 500 ml. quantities of benzene (rendered lukewarm if necessary). After agitation for about 5 minutes and decantation of the two solvents, the aqueous phase was withdrawn and extracted again with 500 ml. of benzene.

The combined benzene solutions contained various products, particularly diethyl phloroglucinol ether, which could be subsequently isolated. The major part of the 3,5-dihydroxy-phenetole was found in the aqueous phase. This solution was evaporated by heating on a water-bath under partial vacuum. The dried and finely-ground residue was taken up in 100 ml. of ethyl ether and then agitated for about ½ hour. After filtration, the ethereal solution was dried over anhydrous sodium sulphate, filtered and then evaporated in vacuo.

The crude 3,5-dihydroxy-phenetole so prepared was purified by fractional distillation at a temperature of 140° to 154° C. and a pressure of 1.4 mm. Hg and then by recrystallization from benzene.

The product obtained, in a final yield of 4.5%, had the appearance of small, pinkish-white crystals, the instantaneous melting point of which was 84° C. The product was soluble in water, ethanol, acetone and ether and slightly soluble in benzene and chloroform.

EXAMPLE 4

3,5-diethoxy-phenol

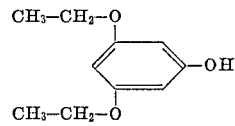

189 g. of anhydrous phloroglucinol and 1 l. of absolute ethanol were introduced into a 2-litre flask provided with an agitation system, a gas inlet tube, a reflux condenser and an outlet bubble counter.

The contents were agitated and, after dissolution of the phloroglucinol, dry gaseous hydrogen chloride was introduced via the inlet tube, the rate being regulated so that the spontaneous elevation of the temperature rapidly produced smooth boiling of the solvent. This boiling was maintained for three hours, utilizing heating on a water-bath when the input of acid was stopped. The flask was cooled and then placed in a refrigerator over-night.

The hydrochloric ethanol was eliminated by heating on a water-bath at reduced pressure. The residue was taken up in two 50 ml. quantities of water and then in two 500 ml. quantities of benzene (rendered lukewarm if necessary). After agitation for about 5 minutes and decantation of the two solvents, the aqueous phase was withdrawn and again treated with 500 ml. of benzene. The benzene solutions were combined.

The aqueous solution contained various products, particularly mono-ethyl phloroglucinol ether, which can be subsequently isolated.

The major part of the 3,5-diethoxy-phenol was found in the benzene solution. This solution was washed three times with 500 ml. of water, dried over anhydrous sodium sulphate, filtered and then evaporated by water-bath heating under reduced pressure. Large light-brown crystals were obtained (M.P.=78°–80° C.).

The crude 3,5-diethoxyphenol so obtained was purified by recrystallization from a mixture of water (500 ml.) and ethanol (300 ml.). The product obtained, in a final yield of 65%, had the appearance of slightly pink crystals having an instantaneous melting point of 89° C. It is soluble in benzene, ethyl ether, acetone and ethanol and very slightly soluble in water.

EXAMPLE 5

Triethoxy-benzene

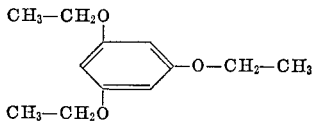

36 g. of anhydrous phloroglucinol and 230 ml. of acetone were introduced into a flask provided with an agitation system, a reflux condenser and a thermometer. The flask was agitated to dissolve the contents. 134 g. of dipotassium carbonate was added. The flask was heated on a water-bath to attain a temperature of approximately 50° C. Then, 140 g. of ethyl sulphate was introduced. Smooth boiling was maintained for 45 minutes. The flask was cooled and then 110 ml. of 20% ammonia, diluted with 250 ml. of water, was added; agitation was continued.

The contents were distilled under reduced pressure to eliminate acetone. The contents were diluted with 1.5 l. of water and extracted with three 200 ml. quantities of trichloroethylene. This solution was washed with four 100 ml. quantities of normal caustic soda and then with 100 ml. of water. The trichloroethylene, isolated by decantation, was dried by means of anhydrous sodium sulphate. This was then filtered and the solvent was eliminated by heating on a water-bath.

The crude triethoxybenzene so obtained was purified by fractional distillation at a temperature of 156°-162° C. at a pressure of 14 mm. Hg.

A slightly yellow liquid was obtained in a yield of 49% which crystallized on cooling in needles having a melting point of 41° C. This product is very slightly soluble in water and is soluble in organic solvents.

EXAMPLE 6

3,5-dipropoxy-phenol

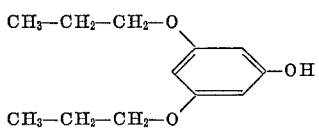

198 g. of anhydrous phloroglucinol and 1 l. of normal propanol were introduced into a 2-litre flask provided with an agitation system, a gas inlet tube, a reflux condenser and an outlet bubble counter. The flask was agitated and after dissolution of the phloroglucinol, dry gaseous hydrogen chloride was introduced via the inlet tube, the rate being regulated so that the spontaneous elevation of the temperature rapidly produced smooth boiling of the solvent. This boiling was maintained for three hours by utilizing the hydrogen chloride input during the first and third hours and by heating on a water-bath when the input of acid was stopped. The flask was cooled and placed in a refrigerator over-night.

The hydrochloric propanol was eliminated by heating on a water-bath at reduced pressure. The residue was taken up in 1 l. of benzene. This was then filtered. The beznene solution was washed with ten 500 ml. quantities of water, dried over sodium sulphate, filtered and then evaporated by heating on a water-bath under partial vacuum. A brown oil was obtained.

The rude 3,5-dipropoxy-phenol so prepared was purified by distillation at a temperature of 95°–144° C. and a pressure of 1.2 mm. Hg. The colorless distillate rapidly became slightly yellow and solidified on cooling. The product obtained, in a final yield of 40%, had the appearance of clear yellow crystals having a melting point of 40° C. It is insoluble in water and soluble in ethanol, ethyl ether, acetone and benzene.

A pharmacological study effected on the compounds of Examples 1 to 6 has given the following results:

COMPOUND OF EXAMPLE 1

The acute toxicity in mice has been determined, the DL–50 being 715 mg./kg. intravenously and 1300 mg./kg. buccally. In strong doses, the animals are hypotonic and calm, with disappearance of the return reflex. The sub-acute toxicity has been studied by administering 250 mg./kg./day of the compound for 1 month. No anomalies have been found.

The antispasmodic effect has been demonstrated in dogs in vitro on isolated ureter at a dose of 500 mcg./ml. and in vivo (10 mg./kg. intravenously, 150 mg./kg. intraduodenally); a considerable antispasmodic activity relative to the intestine has been shown and to a lesser degree relative to Oddi's sphincter and the ureter, but no activity relative to the bronches.

In a dose of 50 mg./kg. intravenously or 150 mg./kg. intraduodenally, the compound of Example 1 causes considerable choleresis in anesthetized rats and dogs. In a dose of 50 mg./kg. intravenously, the choleresis is increased by 100% at least for 90 minutes in anesthetized rats.

3,5 - dihydroxy-anisole has no cardiovascular action and does not modify the effects of adrenaline, of acetyl-choline, the reflex resulting from carotid occlusion or from central or peripheral vagal stimulation. It exerts a sedative effect and potentiates barbiturate sedation. However, these depressive effects on the central nervous system remain moderate.

The effect of 3,5-dihydroxy-anisole on the uterus has been studied in vitro and in vivo. In a dose of 35–140 mcg./ml., it diminishes the tone of isolated rat uterus in oestrus, in the presence or absence of ocytocine. Intravenously (35–140 mcg./kg.), it diminishes uterine peristalsis spontaneously or in the presence of ocytocine in rats in oestrus and also in cats.

COMPOUND OF EXAMPLE 2

3,5-dimethoxy-phenol in mice has an acute toxicity (DL–50) of 180 mg./kg. intravenously and 660 mg./kg. buccally. Strong doses are sedative. A sub-acute toxicity effect in rats at a daily dose of 60 mg./kg. for a month showed no anomalies.

This compound tested in vitro and in vivo (I.V. 15 mg./kg., I.D. 66 mg./kg.) shows antispasmodic effects relative to the intestine, Oddi's sphincter and to a lesser degree relative to the ureter. The antispasmodic action is clearly musculatropic.

In a dose of 15 mg./kg. I.V. and 66 mg./kg. I.D., it increases choleresis by 140% for ¼ hours in anesthetized dogs and by 50% for 90 minutes in anesthetized rats.

In a dose of 15 mg./kg. I.V., it has no cardiovascular action as such and does not modify that of reagents such as acetyl-choline, adrenaline, the reflex of carotid occlusion and central and peripheral vagal stimulation. It has a vasodilative action in the musculocutaneous areas of paws when administered directly into the femoral artery.

3,5-dimethoxy-phenol decreases mobility and potentiates barbiturate sedation in mice. It thus has a sedative effect on the central nervous system.

COMPOUND OF EXAMPLE 3

3,5-dihydroxy-phenetole in mice has an acute toxicity (DL–50) of 450 mg./kg. intravenously. The main symptom observed at strong doses is sedation.

The antispasmodic activity has been studied; in vitro, the compound diminishes spontaneous contractions of isolated dog ureter; in vivo in dogs at 45 mg./kg. I.V., the antispasmodic effect occurs at the intestine and at Oddi's sphincter and to a lesser degree at the ureter; it is virtually nil at the uterus.

In guinea pigs, the intestinal antispasmodic action is appreciable in a dose of 25 mg./kg (⅟₆₀ of the buccall DL–50).

In dogs subjected to the action of morphine and of prostigmine, the compound in doses of 160 and 110 mg./kg. I.D. exerts a relaxing effect on stimulated peristalsis.

3,5-dihydroxy-phenetole intravenously (45 mg./kg.) and in particular intraduodenally (225 mg./kg.) increases choleresis in anesthetized rats. The choleretic effect is found in dogs premedicated with morphine and prostigmine when the compound is injected intravenously, but disappears when the administration is made intraduodenally.

3,5-dihydroxy-phenetole has no marked cardiovascular properties and does not modify the action of acetyl-choline and of adrenaline. It has no material action on the central nervous system; there is a moderate sedative action, however.

COMPOUND OF EXAMPLE 4

In mice, the toxicity has been studied by intraperitoneal administration in view of the low solubility of the product. No mortality was observed up to a dose of 200 mg./kg.

On isolated rat duodenum compared with the contraction produced by barium chloride in doses of 40 mcg./ml., it exerts an antispasmodic effect.

On isolated guinea pig ureter, doses of 20 and 100 mcg./ml. arrest the spontaneous contractions.

In vivo in guinea pigs, doses of the product in suspension of 10 and 20 mg./kg. given intravenously diminish peristalsis.

COMPOUND OF EXAMPLE 5

In mice, the product in suspension in "Tween 80" does not cause death given intraperitoneally in a dose of 2 g./kg.

On isolated rabbit heart a dose of 100 mcg./ml. increases coronary output (+22%).

In guinea pigs, a dose of 250 mg./kg. given intraperitoneally causes hyptension and decrease of intestinal peristalsis.

In anesthetized rats, this compound causes hypercholeresis which begins in the first ¼ hours following intraduodenal administration of 250 mg./kg., attains a maximum (+48%) after 30 minutes and lasts more than 90 minutes (+29%).

COMPOUND OF EXAMPLE 6

In mice by intraperitoneal administration, the water-insoluble product causes no mortality in a dose of 250 mg./kg. A quarter of the animals died at a dose of 1 g./kg.

This compound is a coronary vasodilator of positive inotropic action on isolated rabbit heart in a dose of 100 mcg./ml. It is antispasmodic on guinea pig ileus in situ given intraperitoneally and intraduodenally in a dose of 250 mg./kg.

It is hypercholeretic in anesthetized rats by the same administrative routes and in the same dose (increase of 70 to 125% for 75 to 90 minutes).

Clinical tests in humans have yielded good results:

The compound of Example 1 proves to be an antispasmodic which is particularly active in the renal area (nephritic colic) and on spasms caused by menstrual disorders, when administered in a dose of 750 mg. to 1 g./day buccally or of 150 mg.–450 mg./day I.V.

The compound of Example 2, in the same dose as the former, gives excellent results in patients affected by hepatic or nephritic colic.

The compound of Example 3, administered buccally in a dose of 750 mg.–1.25 g./day or of 100 mg. 3 times a day I.V., proves very effective in the treatment of enterocolitis and in migraine conditions of biliary origin.

The phloroglucinol ethers of the invention thus have antispasmodic properties in the gastro-intestinal, renal and uterine fields and very interesting hypercholeretic properties. They can be included with the usual physiologically-acceptable vehicles in pharmaceutical compositions for oral or parenteral administration. For example, tablets, cachets or hard gelatine capsules containing a dosage unit of 200–300 mg. of active compound can be prepared or injectable ampoules containing a dosage unit of 50–150 mg. of active compound.

I claim:

1. A method of treatment of gastro-intestinal, renal and uterine spasms, and hepatic and nephritic colitis which comprises administering to a subject in a condition to benefit therefrom, an effective quantity of a phloroglucinol ether of the formula:

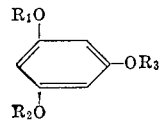

in which $R_1$, $R_2$ and $R_3$ are the same or different and each is hydrogen or alkyl having up to 3 carbon atoms, with the proviso that at least one of $R_1$, $R_2$ and $R_3$ is an alkyl group and that, when each of $R_1$, $R_2$ and $R_3$ is an alkyl group, they are the same and each has 2 or 3 carbon atoms.

2. A method according to claim 1, which comprises administering to the subject 500 mg. to 1.5 g. in 3 to 5 oral doses per day, or 100 to 300 mg. in 3 parenteral doses per day, a phloroglucinol ether of claim 1.

3. A method according to claim 1, wherein the phloroglucinol ether is 3,5-dihydroxy anisole.

4. A method according to claim 1, wherein the phloroglucinol ether is 3,5-dimethoxyphenol.

5. A method according to claim 1, wherein the phloroglucinol ether is 3,5-dimethoxy-phenetole.

6. A method according to claim 1, wherein the phloroglucinol ether is 1,3,5-diethoxy-phenol.

7. A method according to claim 1, wherein the phloroglucinol ether is 1,3,5-triethoxy-benzene.

8. A method according to claim 1, wherein the phloroglucinol ether is 3,5-dipropoxy-phenol.

References Cited

Chem. Abst. (1), 52, 12855h.
Chem. Abst. (2), 51, 2671a.
Chem. Abst. (3), 58, 6660d.
Chem. Abst. (4), 65, 20046g.
Chem. Abst. (5), 51, 2622–2623.

STANLEY J. FRIEDMAN, Primary Examiner